United States Patent [19]

Pierce

[11] Patent Number: 4,594,727

[45] Date of Patent: Jun. 10, 1986

[54] SYNCHRONOUS RECEIVER

[75] Inventor: O. Leon Pierce, Huntsville, Ala.

[73] Assignee: Universal Data Systems, Huntsville, Ala.

[21] Appl. No.: 455,855

[22] Filed: Jan. 5, 1983

[51] Int. Cl.[4] .......................................... H04L 27/22
[52] U.S. Cl. ...................................... 375/83; 329/50; 329/110; 329/112; 340/347 AD
[58] Field of Search .................... 375/10, 52, 82, 83, 375/99, 101, 84, 85, 86, 95, 97; 330/252, 260, 261; 328/162; 371/5, 6; 340/347 AD; 329/50, 110, 112; 455/205

[56] References Cited

U.S. PATENT DOCUMENTS

| | | | |
|---|---|---|---|
| 3,506,918 | 4/1970 | Perreault | 328/162 |
| 3,534,273 | 10/1970 | Thomas | 328/162 |
| 3,573,727 | 4/1971 | Freeny | 371/5 |
| 3,721,959 | 3/1973 | Gzorge | 375/10 |
| 3,736,507 | 5/1973 | Wolejsza, Jr. et al. | 325/30 |
| 3,767,587 | 10/1973 | Matsuo et al. | 325/320 |
| 3,806,918 | 4/1974 | Cauthron et al. | 340/347 DD |
| 3,906,380 | 9/1975 | Querry et al. | 329/122 |
| 4,034,340 | 7/1977 | Sant'Agostino | 375/10 |
| 4,138,644 | 2/1979 | Godard et al. | 375/101 |
| 4,163,206 | 7/1979 | McRae | 375/101 |
| 4,201,888 | 5/1980 | Jacobson | 330/252 |
| 4,213,006 | 7/1980 | Gerges | 375/97 |
| 4,280,224 | 7/1981 | Chethik | 375/95 |
| 4,313,219 | 1/1982 | Gabler et al. | 375/97 |
| 4,376,309 | 3/1983 | Fenderson et al. | 375/101 |
| 4,387,461 | 6/1983 | Evans | 375/10 |
| 4,393,499 | 7/1983 | Evans | 375/10 |
| 4,449,102 | 5/1984 | Frazer | 328/162 |
| 4,449,223 | 5/1984 | Liskov et al. | 375/10 |
| 4,466,108 | 8/1984 | Rhodes | 375/97 |

OTHER PUBLICATIONS

Saha and B. C. Mazumder, "A Digital Phase-Locked Loop for Generating Frequency Discrimination Digital Words", IEEE Proceeding, vol. 70, No. 2, Feb. 1982.
Lindsay & Chie, "A Survey of Digital Phase-Locked Loops", IEEE Proceedings, vol. 69, No. 4, Apr. 1981.

Primary Examiner—Robert L. Griffin
Assistant Examiner—Stephen Chin
Attorney, Agent, or Firm—Weingarten, Schurgin, Gagnebin & Hayes

[57] ABSTRACT

A synchronous receiver for receiving a phase shift modulated signal having binary data at a clock rate occurring within a baud interval. The synchronous receiver provides multiple estimates of the signal phase during selected portions of the baud interval, wherein the resulting phase values are averaged to provide a data output of low error rate and high reliability. The synchronous receiver of the present invention independently recovers the carrier and clock signals by separate digital phase-locked loops, wherein the resulting signals are used by the synchronous detector portion to recover the digital data. Moreover, the data acquisition time is improved by variable bandwidth characteristics of the phase locked loops.

21 Claims, 5 Drawing Figures

SYNCHRONOUS RECEIVER

FIELD OF THE INVENTION

This invention relates to synchronous receivers and in particular to digital synchronous receivers having digital phase locked loops therein for demodulating differential phase shift keyed signals.

BACKGROUND OF THE INVENTION

In digital data systems having phase modulated carriers, the carrier is modulated by adjusting its phase according to a selected number of degrees phase shifted. The amount of phase shift is quantified according to 360° divided by the number of data that it is to be encoded. Typically, a four state per sample (di-bit) phase shift modulated data system will provide a carrier which is modulated at 90° increments. The time interval over which the data modulates the carrier is a baud period typically comprising one or two cycles of the carrier frequency. A plot of the data signal over time provides a square wave-like signal having one of four amplitude values. A sequence of data signals to be transmitted at the baud rate reveals a step-like signal changing at periodic intervals. Since the rapid transition from one data value to another, through the phase shift modulated means, would consume an inordinate amount of spectrum space, and in view of the band pass filtering typically provided for modem reception, the transition points are broadened such that the sequence of step wise changes is reformed to a more gradual like signal trace forming the well known "eye" pattern. Previous data demodulators have provided for signal sampling only at the center of the open eye period, where the signal quality is felt to be most representative of the data which is used to modulate the carrier. However, receivers detecting the signal have difficulty in defining the center of the eye pattern and difficulty in providing a reliable phase detection at that point when the received signal is not well defined at the points where the signal is sampled.

In differentially encoded phase shift signals, the data is represented by the difference in relative signal phase between one baud period and the next. Typically, receivers of this nature compare a signal representative of one baud period with the signal of the subsequent baud period, wherein the detected phase data signal is provided by the comparison directly. However, when the signal becomes noisy such that the phase of one or both of the signal baud periods includes significant error signal modulation, error is added in both the present and subsequent baud intervals, reducing the noise sensitivity of the receiver.

SUMMARY OF THE INVENTION

The synchronous receiver of the present invention recovers data signals in a digitally modulated carrier by multiply sampling the modulated signal over a predetermined time period within the open area of the baud interval eye pattern, and averages the samples over the sample period to provide a high reliability recovered phase value. Each baud interval carrier phase signal value is independently detected by comparing the received signal to separate internally generated recovered carrier signal. Thereafter, each detected phase signal is compared to a signal of subsequent baud periods to create the respective differential phase data signals. According to the present invention, the baud or data clock interval is identified by a separate internal baud clock recovery subsystem.

The data recovery portion of the synchronous receiver provides multiple sampling of the received signal by comparing the recovered carrier to the received signal at several points within the open portion of the signal eye area. Moreover, the number of samples is doubled by splitting both the recovered and received signals into quadrature pairs before comparisons among the signal pairs are made. Thereafter, the phase samples are combined, received and averaged by digital integrators to produce a data output signal. The resulting data output signal is then stored for comparison with subsequent digital phase signals to decode the differential phase data. By detecting a differentially encoded phase shift signal in this manner, the synchronous receiver of the present invention achieves improved signal-to-noise performance.

The recovered clock and carrier signals are provided by digital phase locked loops. Each phase locked loop includes a digital phase detector which receives the loop input signal and the loop output signal, and a controllable pulse circuit which provides a digital signal having a number of pulses which number is selectable according to the digital phase detector output. The phase locked loop further comprise clock means which provide the loop output signal from a combination of a fixed pulse rate reference signal and a variable offset signal, according to the digital phase detector output.

DESCRIPTION OF THE DRAWING

These and other features of the present invention are better understood by reading the following detailed specification together with the drawing, wherein.

DETAILED DESCRIPTION OF THE INVENTION

Figure 1:
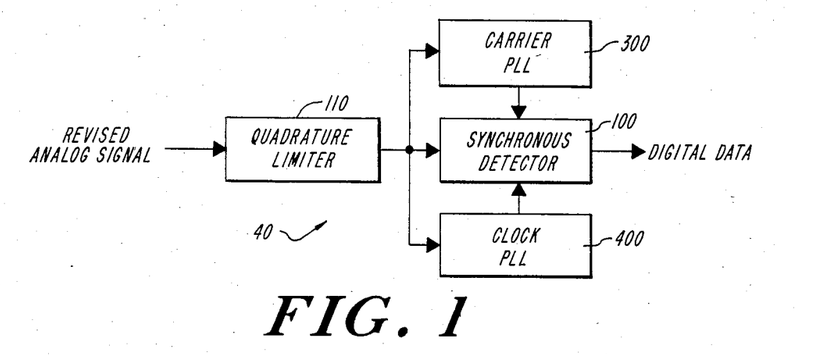
FIG. 1 is a block diagram of the synchronous receiver.
Figure 2:
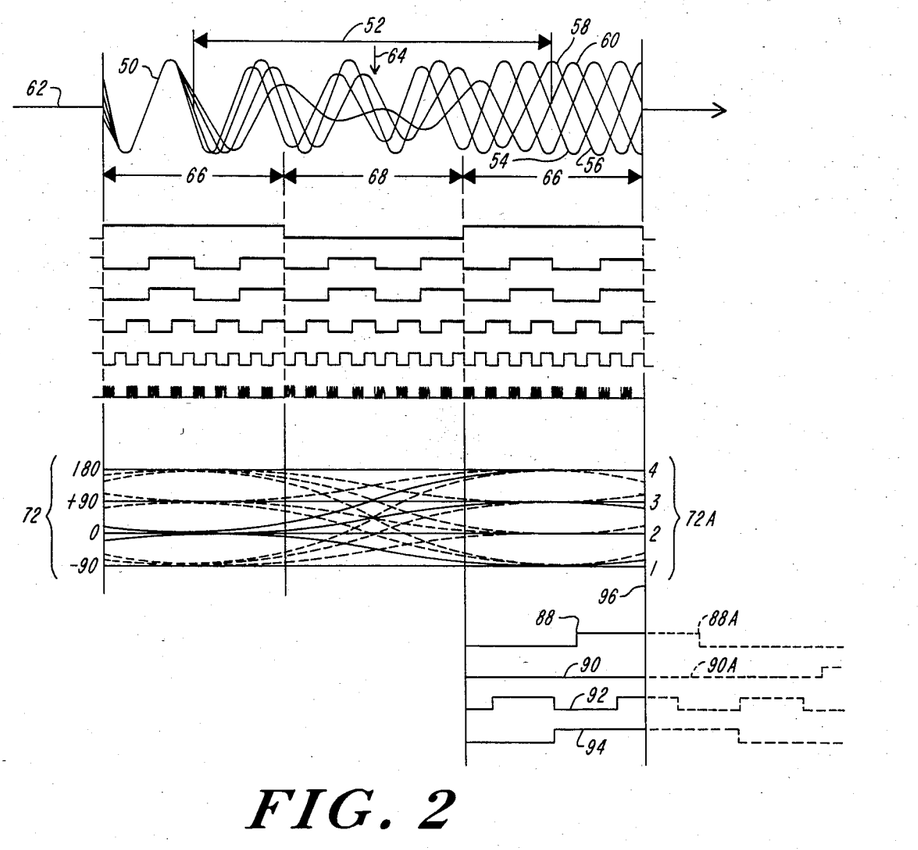
FIG. 2 is a graph of the waveforms of signals associated with the synchronous receiver.

The synchronous receiver 40 of the present invention is shown in the block diagram of FIG. 1. The analog received signal is converted to quadrature digital signals by quadrature limiter 110. The quadrature digital signals are decoded by a synchronous detector 100 to provide digital data output signals. The synchronous receiver 40 includes a separate carrier phase-locked loop 300 and clock (baud) phase-locked loop 400 to provide local signals of particular frequency and phase relationships needed for the operation of the synchronous detector 100. Signals relating to the synchronous receiver of the present invention are shown in FIG. 2, wherein the analog received signal 50 which undergoes a selectable phase shift over a baud period 52 is indicated by one of four phase related signals 54, 56, 58, and 60. Each signal relates to a relative phase shift of 90° from the signal 50 and the beginning of the baud interval 52. The baud period or baud intervals are contiguous, therefore the phase of the signal 50 at the end of one baud period will be the starting phase of the signal of the subsequent baud interval. Although the representative received signal 50 is shown crossing the zero axis 62 at the onset of the baud period 52 to assume one of the four (54, 56, 58 and 60) signals at the end of the baud period 52, the signal 50 may initially begin at a different phase increment not shown and proceed to one of the four specified at the end of the baud period.

In FIG. 2, the received signal data is represented by the curve 70, and corresponds to the signal 50 phase shift measured over the particular baud period 52. The resulting data corresponds to one of four 74, 76, 78 and 80 states, having a particular phase 72, each phase relates to an arbitrary logic value 72A for the four respective signals described above. Similarly, the data values are possible and may arise from signals having other relative starting phase angles, shown as dotted curves 82, 84 and 86 with a transition to one of the four final phase values 74, 76, 78 and 80. According to the requirement of digital communication devices, the relative phase of the received signal is measured at the relative phase positions at the beginning and end of a particular baud. However, modem bandwidth and other signal parameter conditions cause the signal transition over the baud interval time period to be gradual and not instantaneous. It therefore corresponds that since the signal is necessarily quantified to the desired data values 72A at the ends of the baud interval, the phase is least quantified at or near the baud interval mid-point 64. Correspondingly, the received signal is most likely to be valid at the end points of the particular baud period 52 and least accurate near the mid point 64. The synchronous receiver according to the present invention independently determines the logic value 72A (according to one of the four possible states) at each end of the baud interval, and then compares each logic value to produce the differential data output.

The phase-shift modulated signal 50 includes frequency and amplitude signal components which are explained by the known modulation theories. Moreover, the typically used commercial communication channels, such as telephone lines, have nonuniform response characteristics including distortions in time delay, frequency band pass, and amplitude response. Moreover, these characteristics vary widely according to the particular telephone line used and the time of usage. Therefore, under certain conditions the received signals may not settle or approach any one of logic value 72A (corresponding to the relative phase quantities 72) in a particular installation receiver. The likely result of signal distortions include a skew or bunching of the logic values 72A wherein the clear separation of values is diminished. The synchronous receiver of the present invention defines a baud interval 52 in response to the signal 50, to further include smaller intervals of time within the baud interval 52. The smaller intervals are shown as 66 and 68, and correspond to time periods wherein the received signal 50 is most likely to have settled near the desired phase value, and a time interval during which the relative phase is least likely to have settled to a particular value. Moreover, the system of the present invention averages several samples of the phase component of the received signal over the time intervals 66 at the ends of the baud interval. The received signal is not sampled during the mid portion 68 of the baud period, nor are recovered clock and carrier signals adjusted as discussed below, in view of the low likelihood of a clear signal indication, which is due to the phase transition in that time interval.

Particularly notable in the system of the present invention is the manner in which the incorporated digital circuits adjust the frequency or number of cycles of signals produced therein. The signals generated in the phase locked loops are periodic only when considered over a finite time interval, such as the baud interval, and are not necessarily to be considered symmetric in time over shorter or arbitrary intervals of time. This is due to the phase lock loops of the present invention which adjust the frequency, or in this case, the number of digital cycles, over an average period length by inserting or subtracting signal transitions therein. The produced signal is then made symmetric by dividing the resulting signal by a digital divider. For instance, a 153.6 KHz±600 HZ signal is produced from a 153.6 KHz signal received from a clock source whereupon 1200 Hz or cycles per second are subtracted at evenly spaced intervals. This involves periodically removing a high-to-low or low-to-high signal level transition point. To the resulting signal a variable 0.-1200 cycle signal is added by adding transitions. The resulting final signal may be made suitably symmetric in time by dividing by a divider/counter. A circuit used to provide this subtraction or addition of number cycles is an exclusive-NOR logic gate, whereupon the transition points of the signals to be combined are aligned to coincide to cause the signal frequencies to subtract, and the signals transition points are offset to cause the signal frequencies to add.

Figure 3:
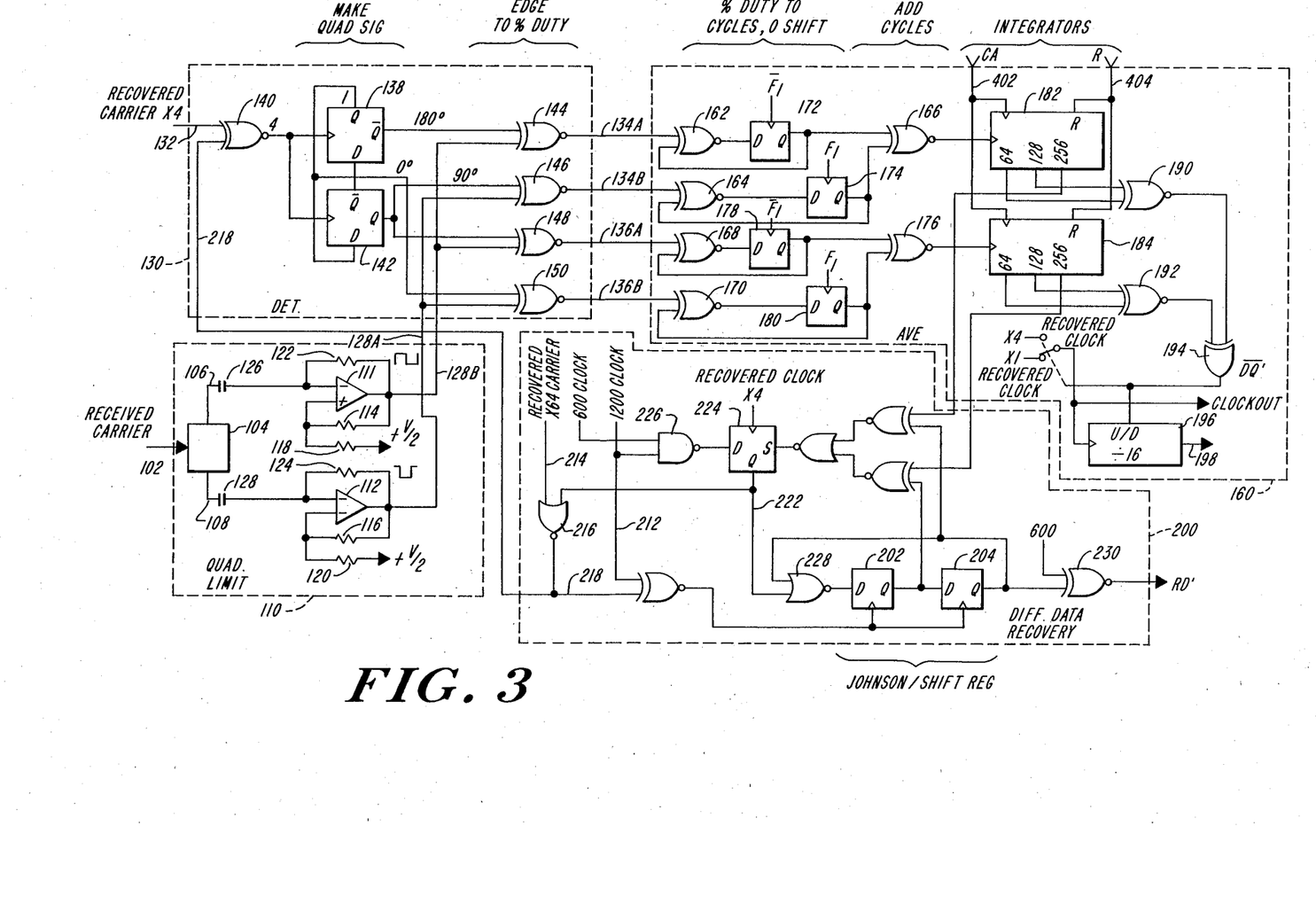
FIG. 3 is a schematic diagram of the data recovery section of the synchronous receiver.

A particular implementation of the synchronous detector providing data recovery during the baud intervals is shown in detail in FIG. 3. According to the present invention, it is considered advantageous to increase the number of samples over which the data information may be recovered. The system shown in FIG. 3 provides an increase in samples by having two-phase data recovery whose resulting signals are independently determined and subsequently averaged together to provide a unified data value output. Therefore, the system 100 of FIG. 3 provides a pair of signals to be processed. However, except for the relative phase difference, the treatment of the signals in quadrature in the data recovery synchronous detector of FIG. 3 is substantially identical, except where noted. The analog signal received at 102 by the quadrature limiter section 110 of the data recovery circuit is an analog signal having signals within a predetermined bandwidth. The signal received at 102 is first processed by a phase-shift network 104 which provides two signals at 106 and 108 corresponding to the input signal, and in relative quadrature relationship. The design of suitable phase-shift networks is known in the art. The signals at 106 and 108 are received by separate limiters, providing sharp transition points corresponding to the zero crossings of the AC coupled analog input signal. Each of the two limiters comprise an amplifier 111 and 112 having positive feedback through resistors 114 and 116, respectively. The amplifiers are biased at a voltage approximately mid-way between the power supply voltage of the amplifiers 111 and 112 and the bias is provided through resistors 118 and 120, respectively. The inverting inputs of the amplifiers 111 and 112 are biased from the respective amplifier output connections through resistors 122 and 124, respectively. The signals from 106 and 108 are received by the respective amplifier 111 and 112 inverting inputs through capacitors 126 and 128, respectively. The resistors 122 and 124 are selected in combination with capacitors 126 and 128 to provide adequate frequency response of the circuit to pass without loss the signals received at 106 and 108. The limiter 110 includes a predetermined amount of hysteresis by which the resistors 116 and 114 are selected according to techniques known in the art. The waveforms resulting from the limiters comprise signals having a uniform amplitude, and waveform transitions corresponding to the relative zero crossing of the respective quadrature analog signals at 106 and 108. The resulting signals are square wave or digital signals, and are received by the detector section 130 for subsequent processing for data recovery processing.

The detector section 130 receives the limited input signals on leads 128A and 128B from the quadrature limiter 110, and compares the signals with the corresponding recovered carrier signal received on the 132. The recovered carrier signal is derived by phase lock loop described below, and is at a rate four times the actual carrier frequencies. During baud intervals 66, the recovered carrier is transmitted through gate 140 to a Johnson counter comprising D-type flip-flops 138 and 142 which produce a two-phased output. When taken in combination with the limited quadrature input signals on leads 128A and 128B each of the two phased output provides a pair of output signals on leads 134A and 134B, 136A and 136B. The four output signals are produced according to logical comparisons provided by exclusive-NOR gates 144, 146, 148 and 150, respectively. The four detector output signals each comprise periodic signals having a duty cycle which corresponds to the phase relationship between the two quadrature-limited signals of leads 128A and 128B, and the flip-flop 138 and 140 outputs signals.

The four detector 130 output signals are received by the averaging section 160 of the data recovery circuit 100 of FIG. 3. Each detector output signal is first converted from a single pulse signal of a particular duty cycle to a variable number of cycles by the exclusive-NOR gates 162, 164, 168 and 170 in combination with D-type flip-flops 172, 174, 178 and 180, respectively. When each detector output is in a logical high state, the exclusive-NOR gates 162, 164, 168 and 170 allow the corresponding flip-flops 172, 174, 178 and 180 to provide an alternating output at a rate corresponding to the respectively received clock frequencies, those being specified as $F_1$ and $\overline{F_1}$. The signals of frequnecies of $F_1$ and $\overline{F_1}$ are equal but complementary in phase, to allow the signal frequencies from the flip-flops 172 and 174, and from flip-flops 178 and 180 to be added by exclusive-NOR gates 166 and 176, respectively. The addition is accomplished by offsetting the edge transitions of the signals received by the exclusive-NOR gates 166 and 176. Since the flip-flops 172, 174, 178 and 180 are edge-triggered, the offset in transition is provided by a complementary pair of clock signals $F_1$ and $\overline{F_1}$. The signals provided by the addition in exclusive-NOR gates 166 and 176 are derived from the quadrature square wave output signals produced by the quadrature limiter 110, and according to the present invention are used to produce a more accurate determination of the data. The output of the exclusive-NOR gates 166 and 176 are each received by a digital integrator 182 and 184 comprising a digital counter having a capacity of $2^8$ data states. The respective most significant bit (MSB) outputs of the integrators 182 and 184 form a 2-bit digital signal having four data states. These data states, when compared to the previously recovered data states from a prior sample period 66, provided a recovered data output according to the differential data recovery section 200 and correspond directly with one of the four phase modulation increments 72 of FIG. 2.

The averaging section 160 output signals on leads 186 and 188 are shown representatively as 88 and 90 on FIG. 2. The data value is defined at the end point of the baud interval 66, indicated on line 96. Under ideal signal transmission condition, the logic values 72A correspond to the associated phase increments 72, assuming the signals at 74, 76, 78 and 80 are clearly separated. This separation is generally maximum in the central position of the end of the interval 66, resulting in the indicated waveforms 88 and 90 intercepting line 96, and by extending the waveform in a dotted line 88A and 90A to indicate the integrator outputs of they are not reset. As the received data transmission becomes deteriorated, the spacing between the phase increments 72, and therefore logic values 72A, becomes reduced and at times overlapping. Deteriorated signal causes the integrator output signals as shown by waveforms 88 and 90 to be skewed in time wherein the end of the baud interval 66 at line 96 occurs more closely to a transition point in those signals of waveforms 88 and 90, and with signals of unacceptable data quality, cause at least one of the gates 190 and 192 to have a low output at the end of interval 66, which in turn produces an unsatisfactory data quality signal from gate 194. It is according to the present invention to provide an indication of the quality of the data signals according to the wave forms 88 and 90 relative to the interval endpoint 96. The quality indication is derived from a combination of exclusive-NOR gates 190 and 192, each receiving the two lesser most significant bit (MSB-1, MSB-2) outputs of the respective integrators 182 and 184, corresponding to division by $2^7$ and $2^6$. Each exclusive-NOR gate 190 and 192 provides an output signal shown by the wave form 92 and 94, respectively, in FIG. 2. The operation of the exclusive-NOR gates in combination with the integrator counter output signals provide a logical high state when the integrator is in a central area of the output signal wave form 88 and 90. The combination of the exclusive-NOR outputs 190 and 192 by NAND gate 194 to provide a data quality output ($\overline{DQ}$) signal. The data quality output signal indicates the occurrence of the integrator outputs shown by curves 88 and 90 as having the appropriate coincidence with the interval 66 and at 96. Moreover, the present invention averages the indication of data quality over an extended period by the up/down counter 196. The up/down counter 196 receives the data quality signal from gate 194 by the counter 196 control point which controls the count up and the count down direction. The counter 196 also receives a clock signal. If the data quality signal indicates that the data does not have a high reliability status, the counter will count up for as many clock baud periods as the data quality remains insufficient. If the data quality becomes adequate, the counter reverses direction and counts down for as many clock periods during which the data quality is adequate. If, over sufficient subsequent baud intervals, the data quality has sufficient time periods of low quality or low reliability, the up/-down counter will preceed to count up and produce an output at 198 to indicate the overflow condition of the counter 196, which would correspond to a sequence of baud intervals having sixteen or more low quality data values over a periods of 32 baud intervals.

The differential data recovery section 200 of the data recovery circuit 100 also includes a Johnson counter comprising flip-flops 202 and 204, whose outputs are sequentially compared to the outputs of the averaging section 160 by exclusive-NOR gates 206 and 208, and combined by NAND gate 210 to provide to a logical high output signal when the Johnson counter outputs equal the integrator outputs on leads 186 and 188. In the process of sequentially comparing the Johnson counter output, the Johnson counter is cycled at a high rate, according to a signal provided by the combination of a 1200 cycle per second signal on lead 212 and a frequency at a 64X multiple of the recovered carrier signal on lead 214 through gate 216 on lead 218; the signal combination is provided by exclusive-NOR gate 220. The recovered carrier signal on lead 214 is enabled by an active low signal on lead 222 from flip-flop 224 during the time allocated for comparison of the Johnson counter with the averaging section 160 output. Specifically, this comparison period occurs after the interval 66 of FIG. 2. when the NAND gate 226 combines a 600 and 1200 Hz clock signal to provide an active low signal during the latter quarter of the 600 Hz clock signal. The signal produced by NAND gate 226 is received by the data input of the flip-flop 224 and appears on the Q output at least 222 upon the clock signal received by the flip-flop 224. The active low signal produced by the NAND gate on lead 222 enables the carrier signal on lead 214 to appear on the lead 218.

In addition to rotating the Johnson counter, the signal on lead 218 also resets the Johnson counter of the detector portion 130 to reflect the current data output values. The carrier signal on lead 218 will appear as long as the NAND gate 210 output remains low; when the NAND gate 210 output becomes high, the Q output of the flip-flop 224 is reset high, inhibiting the signal on lead 218. The data is derived from a difference between the phase values at successive baud intervals, and corresponds to the phase increments necessary to update Johnson counter of elements 138 and 142. Therefore, the Johnson counter comprising flip-flops 138 and 142 in the detector section 130 is incremented by the same number of phase steps as the Johnson counter comprising flip-flop 202 and 204 of the differential data recovery section 200, restoring the phase of the recovered carrier equal to the phase of the incoming signal. Therefor, the reading of the integrator at the following baud interval is a direct reading of phase values. The synchronous receiver of the present invention provides a data output according to the differential phase over a predetermined baud interval. By setting the detector phase 130 counter according to the previous determined phase signal at the differential data recovery section 200, the data is simply recovered by reading the digital state of the Johnson counter in the differential data recovery section 200. This differential data (desired data) is provided by disabling the Johnson counter function after the counter is incremented to equal the states of the integrators 182 and 184, and converting it into a shift register by the action of the NOR gate 228.The flip-flops 202 and 204 become a shift register by interrupting the recirculation through the NOR gate 228 when the signal on lead 222 becomes a logical high. At this time the output from the flip-flops 202 and 204 are transmitted through the exclusive NOR gate 230 to the external apparatus as received data signal. The exclusive NOR gate 230 receives a 600 Hz recovered clock signal to convert the shift register output signals to a logical representation corresponding to the transmitted data which modulated the received signal. Of particular note is the recovery of the differential phase information independent of the actual clock and carrier signal information for each baud interval. The signal characteristics within the baud interval are independently converted to a restored clock frequency and a restored carrier frequency signal which are in turn used by the data recovery circuit of FIG. 3 to provide a high reliability, low noise sensitivity recovered data signal.

Figure 4:
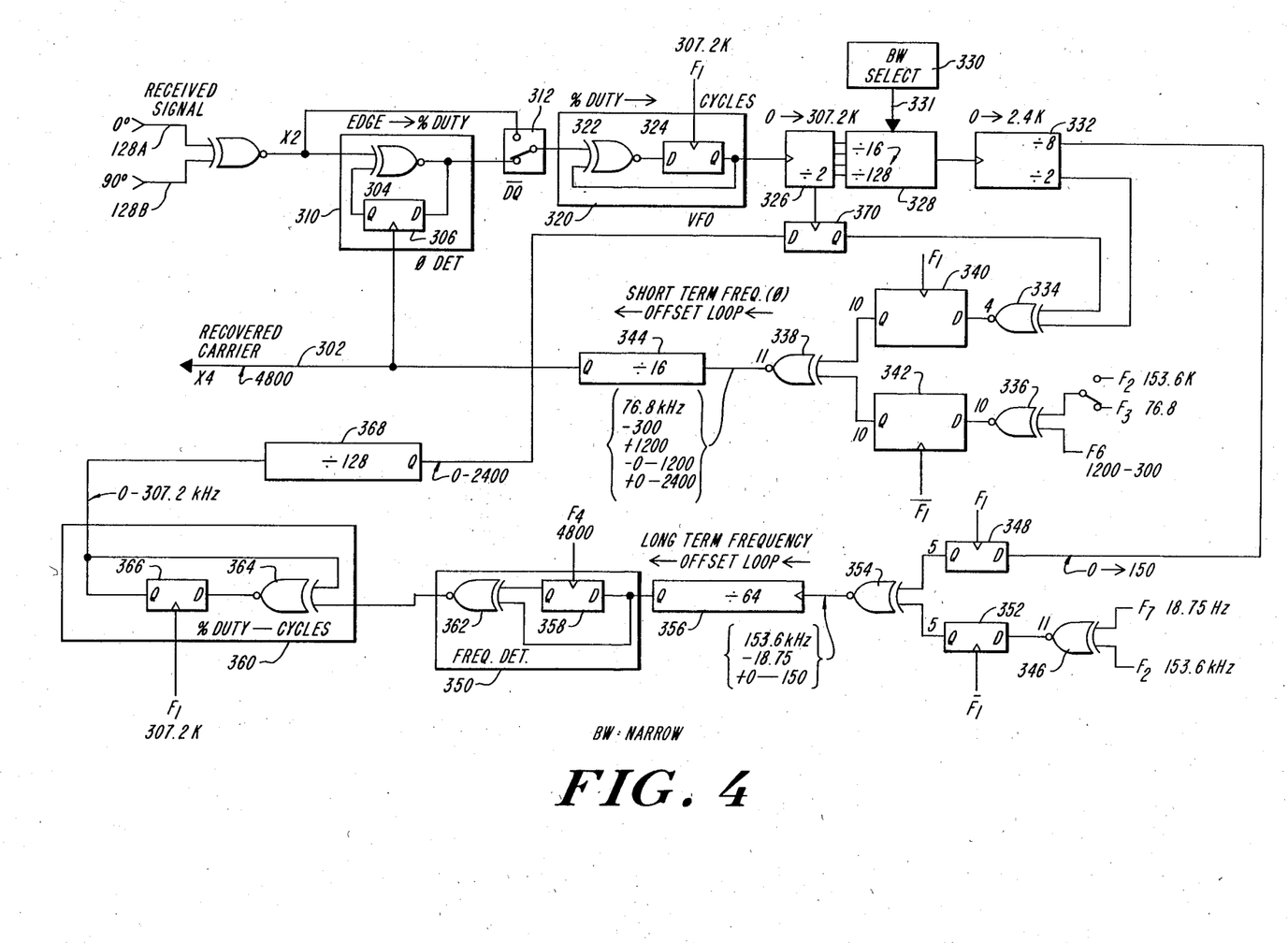
FIG. 4 is a schematic diagram of the carrier recovery loop.

The carrier is recovered by a phase lock loop 300 shown in FIG. 4. In operation, the carrier recovering loop compares the phase of the received and loop generated recovered carrier signals to produce a first signal having a variable duty cycle. The variable duty cycle signal gates at 153.6 KHz signal to producce a first variable "frequency" signal. The average "frequency" varies from 0 to 153.6 KHz as the corresponding duty cycle varies from 0 to 100%. This signal is divided and received by a phase correction circuit and a frequency correction circuit, the latter to correct for long term carrier loop frequency errors.

The frequency correction circuit receives the first variable frequency signal divided by 1024, producing a signal in the range of 0 to 150 Hz. This signal is added to a difference between signals having frequencies of 153.6 KHz and 18.75 Hz, respectively. The sum is then divided by sixty-four to produce a signal having a frequency of about 2400 Hz, depending on the contribution from the first variable frequency signal. The divided signal is compared to a fixed frequency signal of 4800 Hz to produce a second variable duty cycle signal, which is in turn converted to a second variable frequency signal of 0 to 153.6 kilocycles. This signal is divided by one hundred twenty eight and substracted from a signal resulting from the first variable frequency signal divided by two hundred fifty six.

The phase correction circuit is formed by adding the above difference signal to a signal formed from the difference of signals of frequency 76.8 KHz and the sum of signals of frequencies 600 and 150 Hz. The different frequency is divided by sixteen to produce the recovered carrier output signal at four times the received signal frequency. The carrier recovery loop of FIG. 4 receives the quadrature signals produced by the quadrature limiter 100 on leads 128a and 128b, and produces recovered signal at the carrier frequency and at frequency multiples thereof.

The carrier recovery loop 300 includes two correction signal paths. These two paths comprise a frequency-lock path including a frequency detector 350, and a phase-lock path including the phase detector 310. Taking first the phase correction path, the carrier recovery loop output signal on lead 302 corresponds to a signal at a frequency multiple (X4) of the recovered carrier signal, (4800 Hz). The phase detector 310 compares the recovered carrier signal on lead 302 with a combination of the quadrature received signals on leads 128a and 128b formed by exclusive-NOR gate 803. The signal at the output of the exclusive-NOR gate 308 is a signal corresponding to twice the received signal frequency. The phase detector includes an exclusive-NOR gate 304 in combination with a D-type flip flop 306 to provide a periodic pulse output of varying duty cycle which corresponds with to relative phase relationship between the received and recovered carrier signals. Upon the occurrence of the falling edge transition of the recovered carrier signal, the flip-flop 306 clocks or moves the data to the Q output to be combined with the exclusive-NOR gate 308 output in the exclusive-NOR gate 304. According to the relative phase relationship between the clock transition and the exclusive-NOR gate 308 output pulse signal, the exclusive-NOR gate 304 output varies in duty cycle between 0 and 100 percent. When the phase-lock loop is providing the appropriate recovered carrier signal on 302, the duty cycle is approximately 50 percent.

The phase detector 310 output signal is passed through gate 312 to the duty cycle-to-frequency converter 320. The gate 312 is operative according to the data quality signal, described above wherein the phase detector 310 output is passed only during periods of high data quality. The converter 320 receives the variable duty cycle signal from the gate 312 and a reference frequency $F_1$ received from a master clock generator. In other conditions wherein the signal may be unreliable (periods of low signal quality), the gate 312 is operative to bypass the phase detector output and pass directly the exclusive-NOR gate 308 output, which corresponds to the received frequency and has a nominal 50 percent duty cycle, providing a neutral effect to the phase-locked loop performance. The converter 320 includes an exclusive-NOR gate 322 and D-type flip-flop 324. The NOR gate 322 receives the duty cycle signal from the gate 312 and the flip flop 324 Q output wherein the NOR gate 322 output cycles according to the frequency signal $F_1$ when the gate 312 output is in a logical high state. With the gate 312 output high, the Q output of the flip-flop 324 produces no changes in the output of the exclusive-NOR gate 322 as the flip-flop is clocked; however, when the gate 312 output becomes logical low, the Q output of the flip-flop 324 alternates according to a received change in the state of the exclusive-NOR gate 322 upon the clock transitions of the signal $F_1$. Included within the circuit are several signals having fixed frequencies, including $F_1$, which are common to other receiver circuits and repeated in the respective descriptions below. Therefore, the signals having the respective frequencies are designated according to the following table:

TABLE 1

| | |
|---|---|
| $F_1$ | 307.2 KHz |
| $F_2$ | 153.6 KHz |
| $F_3$ | 76.8 KHz |
| $F_4$ | 4800 Hz |
| $F_5$ | 150 to 9600 Hz (selectable) |
| $F_6$ | (150 to 1200) (selectable) + 600 Hz |
| $F_7$ | 18.75 to 150 Hz (selectable) |

The frequencies $F_5$, $F_6$, and $F_7$ are selectable according to a variable bandwidth feature of the phase-lock loops according to the present invention, and is discussed below. The output of the converter 320 comprises a periodic burst of pulses having a burst duration related to the duty cycle of gate 312 output. The pulses have a pulse rate equal to ] $F_1$ during the active period of the gate 312 signal; the inactive period of the signal from the gate 312 will cause the converter 320 to produce no pulses. The burst rate occurs at a rate corresponding to the exclusive-NOR gate 308 output signal frequency and is directly related to the received signal. The converter 320 output is received by counter 326 having a plurality of outputs corresponding to a signal division by various powers of 2. A selection of the particular output signal of the counter 326 is made by selector 328 according to a bandwidth select signal on lead 330, originating from a bandwidth selector 331. According to the present invention, the bandwidth selector signal on lead 330 controls the selector 328 to initially provide the highest frequency from the counter 326, thereafter to sequentially select lower and lower frequencies by selecting a division of a higher power of 2 by the divider 326 output. The selected bandwidth is sequentially reduced over a time interval after the carrier is received by bandwidth control 331 which comprises a binary counter incremented over time. Therefore, when the gate 312 output is at zero percent duty cycle or close to it, the output from the converter 320 and the derived output from the selector 328 is close to 0 Hz. Similarly, if the signal from the gate 312 increases towards 100 percent duty cycle, the converter output is close to or equal to 153.6 Khz, and the corresponding selector 328 output is close to the maximum frequency of the selected counter output for the desired carrier recovery loop bandwidth. The selector 328 output is received by divider 332 which has a divide-by-2 output, which is in turn received by exclusive-NOR 334. The exclusive-NOR gate 334 also receives the signals from the frequency-correction circuit, discussed below, and combines the number of cycles from each correction loop. The exclusive-NOR gate 336 combines the frequency $F_3$ with a frequency $F_6$. The signals from the exclusive-NOR gates 334 and 336 are added by the exclusive-NOR gate 338 to produce a frequency derived from a standard reference frequency, and adjustable according to the relative phase of signals as measured by the relative phase by phase detector 310. The signals are added by aligning the transitions of the exclusive-NOR gate output signals to be offset in time. Therefore, when combined by the exclusive-NOR gate, an increased number of transitions results, corresponding to the addition of frequencies. This is provided by delaying relatively one signal according to the other signal by passing each signal (exclusive-NOR gate 334 and 336) through a separate flip-flop 340 and 342, respectively. Each flip-flop 340 and 342 are clocked by a different signal having the same frequency but complimentary (180° phase difference) signal relationship. In particular, the signals are $F_1$ and $\overline{F_1}$, the highest system frequency. A signal provided by the exclusive-NOR gate is divided by counter 344 by a factor of 16 to produce the signal on lead 302. When the carrier recovery loop 300 becomes stabilized, the signal on lead 302 is a recovered carrier signal at a multiple (4X) of the received signal carrier frequency.

Long term frequency errors are corrected by an offset frequency provided by a separate portion of the carrier recovery loop. The counter 332 also provides an output at a rate corresponding to the input divided by eight (8), which is then added by the exclusive-NOR gate 354 to a signal comprising the signal $F_2$ subtracted by the signal $F_7$ in exclusive-NOR gate 346 by aligning the transitions of signals of frequency $F_2$ and $F_7$ to coincide. The signals from counter 332 and gate 346 are added by the exclusive-NOR gate 354 by offsetting the transitions according to a staggered or complementary gating sequence through flip-flops 348 and 352. As described above, the flip-flops 348 and 352 each receive input signals which then appear on the respective outputs according to complementary clock signals. In this manner, the transitions of the signals received by the exclusive-NOR gate 354 do not coincide, causing an output signal to result having the number of transitions being equal to the sum of the frequencies. The exclusive-NOR gate 354 output signal is received by a divider 356 providing an output signal corresponding to of the input signal divided by sixty four. The output signal frequency from the counter 356 is approximately 2400 Hz plus or minus an amount to be determined by the duty cycle of the gate 312, described above. The counter 356 output signal is compared with a signal of frequency fo $F_4$ by a phase detector 350. The phase detector 350 includes a D-type flip-flop 358 and an exclusive-NOR gate 362 connected to provide a variable duty cycle output pulse according to the relative phase relationship between the respective rising edge of the signal $F_4$ and the received signal from the counter 356. The phase detector 350 compares the counter 356 output signal not to the recovered signal (the signal on lead 302) but to a fixed reference frequency $F_4$. In this manner a signal results indicating a long term frequency offset between the received signal and the internal closed signals. The resulting variable duty cycle pulse sequence is received by a converter 360 to convert the variable duty cycle into a variable length repetitive first pulse signal. The converter 360 includes an exclusive-NOR gate 364 and a D-type flip-flop 366, and is connected to be operative in a manner similar to the converter 320 above. The converter 360 output signal comprises a periodic burst of pulses having a burst duration proportional to the duty cycle of the converter 360 input signal from the phase detector 350. The resulting variable length burst signal is received by counter 368 providing an output signal corresponding to the input signals divided by 128. The divider 368 input varies in number of cycles per pulse from 0 to 307.2 KHz according to the relative duty cycle provided by the phase detector output signal. Correspondingly, the counter 368 output signal spans a range of 0 to 2400 pulses per second. The counter 368 output signal is subtracted from the output of counter 332 in exclusive-NOR gate 334 by aligning the transitions of each signal to coincide. The alignment of transitions is provided by a D-type flip-flop 370 receiving a clock signal from counter 326, the clock signal being one-half of the counter 326 input signal frequency. The subtraction provided by exclusive-NOR gate 334 when both signals received have coincidental logical level transitions. In this manner, the operation of the exclusive-NOR gate 334 provides a constant output level whenever both inputs make a simultaneous change of logic state. The gate 334 output signal is then combined with a signal from gate 336 in gate 338, to be then received by counter 344. The counter 344 output signal is compared to the received signal from gate 308, and corresponds in frequency and phase to carrier of the received signal when the carrier recovery loop 300 is operative according to the above descriptions.

Figure 5:
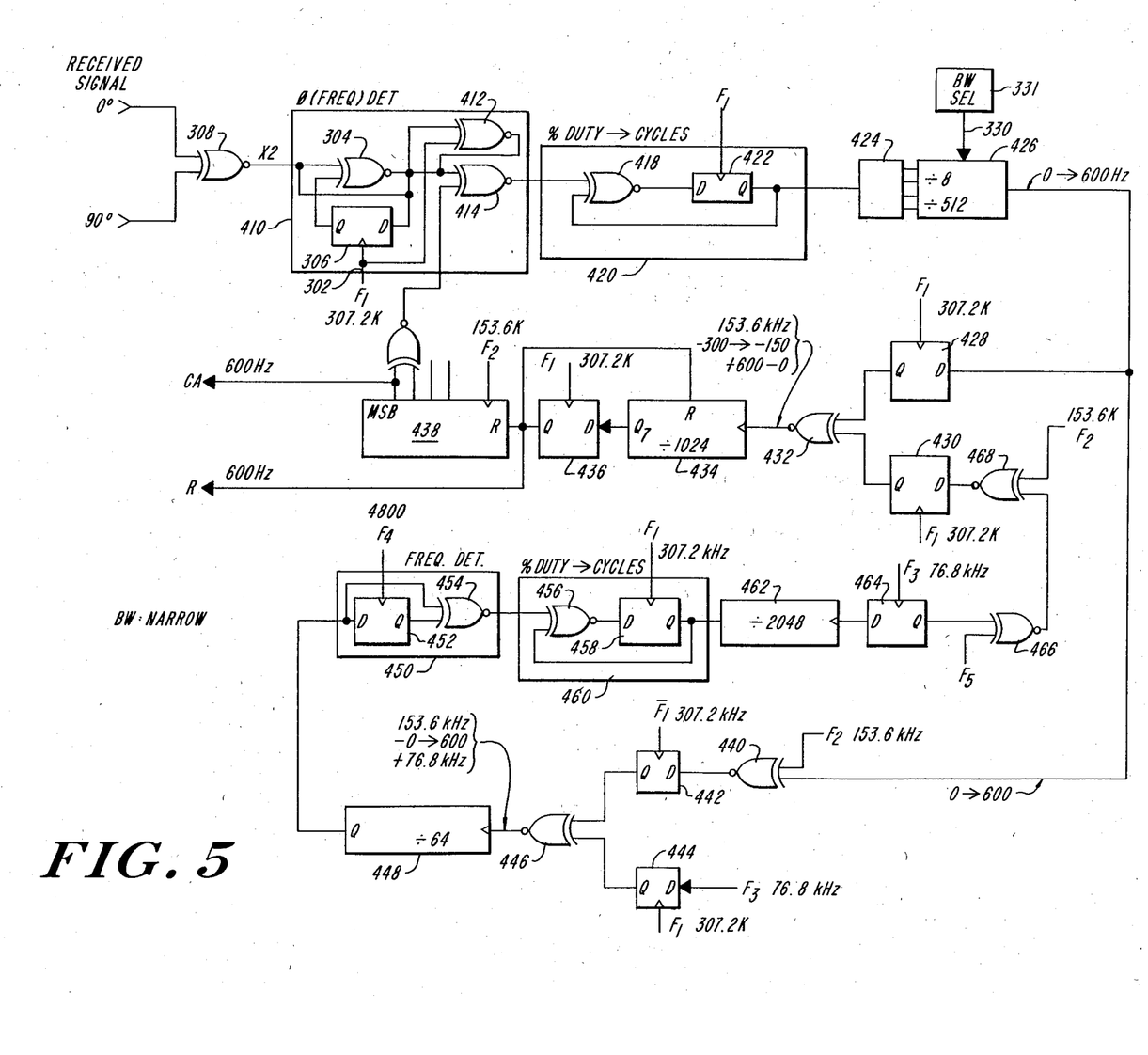
FIG. 5 is a schematic diagram of the clock recovery loop.

The clock signal which corresponds to the baud interval 52 is regenerated by a clock recovery loop 400 shown in FIG. 5. As with the carrier recovery loop 300 discussed above, the clock recovery loop 400 includes two sections, comprising a frequency and a phase correction section.

In operation the clock recovery loop 400 compares the phase of the received and loop generated recovered clock signals to produce a first signal having a variable duty cycle. The variable duty cycle signed is converted into a first variable "frequency" signal having a number of pulses of a fixed frequency $\frac{1}{2}$ $F_1$ (153.6 KHz=$F_2$) signal, the number of pulses corresponding to the variable duty cycle signal. The variable frequency signal is divided in frequency and received by a phase correction circuit, and a frequency correction circuit, the latter correcting for long term frequency offset.

The frequency correction circuit substracts the variable frequency signal from a signal of frequency $F_2$ (153.6 Khz) and adds the result to a signal of frequency $F_3$ (76.8 KHz). The result is divided by sixty-four to produce a signal having a frequency equal to or slightly less than 2400 Hz. Thereafter, the signal is compared (in phase) to a signal of frequency $F_4$ (4800) and converted to a second variable duty cycle signed, which is then converted to a second variable frequency signal having a variable number of cycles of a signal at frequency $F_2$ (153.6 KHz). The second variable frequency signal is divided by 2048 (0-8.75 Hz) and then substracted from a signal of frequency $F_4$ (150-9600 Hz, selectable), and substracted from a signal of frequency $F_2$ (153.6 KHz).

The result is added to the first variable frequency signal to form the phase correction circuit, thereafter to be divided by 1024 to produce an integrator (of FIG. 2) reset signal, and to be further divided to produce the recovered clock signal, which is phase compared to the received signals to produce the first variable duty cycle signal, discussed above.

The clock recovery loop 400 receives the exclusive NOR gate 308 output (as above described in the carrier recovery loop 300) and the reference frequencies of Table 1. Produced are the recovered clock signal on lead 402 which controls the count enable of the integrators 182 and 184 of the averaging section 160 of the data recovery circuit of FIG. 3, and the associated integrator reset signal on lead 404. The phase comparator 410 includes the phase detector 310 of FIG. 3, comprising an exclusive-NOR gate 304 and a D-type flip-flop 306 which also receives a recovered clock signal on lead 302 at 4 times the received signal clock rate. The flip-flop 306 and exclusive-NOR gate 304 are connected to provide a signal having a variable duty cycle according to the relative phase (coincidence) between the clock signal and the NOR gate 308 output signal. The NOR gate 304 output is received by a NOR gate 412 which also receives the clock signal on lead 302, to invert the variable duty cycle signal. Thereafter, the exclusive-NOR gate 412 output signal is received by an exclusive-NOR gate 414, which also receives a signal corresponding to the recovered clock signal from exclusive-NOR gate 416, and adjusts the duty cycle according to the relative phase relationships between the two signals. Therefore, the output of exclusive-NOR gate 414 includes the phase coincidence between the signal from exclusive-NOR gate 416 and the received signal from exlusive-NOR gate 308 and the clock signal on lead 302. The output from the phase detector 410 comprises a variable duty cycle signal which is in turn received by a converter 420 to convert the percentage duty cycle into a burst sequence of a corresponding number of cycles, the burst occurring at a period related to a multiple (2X) of the received signal. The converter 420 generally corresponds to the converter 320 of FIG. 4, wherein an exclusive-NOR gate 418 and a D-type flip-flop 422 clocked by a signal of frequency $F_1$, are connected in combination to provide a variable number of cycles corresponding to the duty cycle of the converter 420 input signal. The converter 420 output signal is thereafter received by a counter 424 having a plurality of outputs corresponding to the input signal divided by various powers of 2, in particular, the signal having the highest frequency corresponds to the counter 424 division by $2^3$, and the lowest frequency output corresponds to the counter division by $2^9$. The outputs from the counter 424 are selected by selector 426, according to the varible bandwidth signal on lead 330, as described above in reference to FIG. 4. The input to the counter 424 corresponds to a number of pulses between the range 0 to 153.6 KHz, and the output signal of the selector 426 corresponds to a frequency range of 0 to 600 Hz when the bandwidth is narrow, causing the lowest frequency signal from counter 424 to be selected. The selector 426 output is then combined in exclusive-NOR gate 432 with the difference between a signal of frequency $F_2$ and the correction signal from the frequency section of the clock recovery loop, discussed below. The addition of the signals in exclusive-NOR gate 432 is provided by offsetting the transition with flip-flops 428 and 430 which receive their respective signals and complementary clock signals of frequency $F_1$ and $\overline{F}_1$. The exclusive-NOR gate 432 output signal is then received by counter 434 providing an output signal corresponding to the input signal divided by $2^{10}$ or (1024). The counter 434 output is then received by D-type flip-flop 436 and a signal having the frequency $F_1$. The flip-flop 436 adjusts the transition of the counter 434 output signal so that the counter 438, receiving the flip-flop 436 output, can be clocked by a signal having a frequency $F_2$ and reset with a signal having sufficient pulse duration to cause a positive or definite reset. Moreover, the reset signal is also received by the counter 343 and the integrators 182 and 184 of FIG. 3 on lead 404. The most significant bit of counter 438 corresponds to the input signal of frequency $F_2$ divided by a factor of $2^8$ power (or 256), forming a 600 Hz signal on lead 402. In addition, the two most significant bits of counter 438 are combined an exclusive-NOR gate 416 to provide a signal to be compared by phase comparator 410, as described above.

The output signal from the selector 426 is also received by the frequency-lock section providing a correction signal for long term frequency offset. The selector 426 output signal is first received by an exclusive-NOR gate 440 to provide a difference between a signal of frequency $F_2$ and the selector 426 output of 0 to 600 Hz (narrow bandwidth). A resulting signal is added with a signal corresponding to $F_3$ in exclusive-NOR gate 446. The frequency is added by offsetting the transitions according to transition delays in flip-flops 442 and 446. The delay is caused by clocking the flip-flops 442, and 446 with signals of complementary phase relationship, $F_1$ and $\overline{F}_1$. The exclusive-NOR gate 446 output signal is received by a counter 448 having an output corresponding to the input divided by $2^6$ (or 64). The counter 448 output is then received by a frequency comparator 450 including a D-type flip-flop 452 and an exclusive-NOR gate 454. The exclusive-NOR gate 454 and the flip-flop 452, also receiving a signal of frequency $F_4$, are connected to provide an output pulse of variable duty cycle at a rate corresponding to the detector 450 input signal. The detector 450 output signal is then received by a converter circuit 460 to provide a variable pulse length signal having a pulse burst at a repetition rate wherein the number of pulses varies from 0 to 307.2 KHz, according to the input signal duty cycle. The converter 460 includes an exclusive-NOR gate 456 and a D-type flip-flop 458, also receiving a signal of frequency $F_1$, connected as are the converters 420, 360 and 320 discussed above. A resulting variable pulse signal is received by a nonresetable counter 462 having an output corresponding to the input divided by a factor of 2048. The counter 462 output signal is received by a flip-flop 464, being clocked by a signal having a frequency $F_3$ to provide a signal having a transition aligned to the combined in exclusive-NOR gate 466 with a signal of frequency of $F_5$. The exclusive-NOR gate 466 output signal is in turn subtracted with a signal having a frequency of $F_2$ in the exclusive-NOR gate 468. The resulting signal transitions are then aligned in flip-flop 430 with the transitions of the signal from the selector 426 to be added in the exclusive-NOR gate 432. The gate 432 output signal is then divided by counters 434 and 438 to produce signals which provide the phase correction signal of the clock recovery loop 400 of the present invention so that the loop 400 output signals on leads 402 and 404 correspond to the clock rate of the received signal.

The data recovery circuit, the carrier recovery loop, the clock recovery loop and associated system elements of the present invention may be implemented in whole or in part in a variety of alternate logic components. The components include but are not limited to discrete integrated circuits and microprocessor components, and as such are within the scope of the present invention. Moreover, substitution and alternate embodiments of the subsections of the system circuits described as performed by those skilled in the art are also within the scope of the present invention. Therefore, the present invention is not to be limited except according to the following claims.

What is claimed is:

1. A synchronous receiver including:
   means for receiving a carrier signal comprising a phase-shift modulated signal with binary data having a baud rate:
   carrier recovery means providing a recovered carrier signal;
   absolute phase comparison means providing an absolute phase output signal related to said binary data and measured by the phase difference between the received phase-shift modulated signal and said recovered carrier signal, comprising:
   a multiple sample means providing a plurality of sampled absolute phase signals; and
   sample average means providing said absolute phase output according to an average of said sampled absolute phase signals.

2. The synchronous reciever of claim 1, further comprising:
   a data transition detector responsive to said baud rate providing a control signal indicating a non-transitional period of said binary data, wherein:
   said absolute phase comparison means provides said absolute phase output signal when enabled by said control signal.

3. The synchronous receiver of claim 1 wherein said baud rate has a corresponding baud interval,
   said phase comparison means providing said absolute phase output signal for a predetermined duration about the center of said baud interval.

4. The synchronous receiver of claim 3 wherein said predetermined duration comprises 50 percent of said baud interval.

5. The synchronous receiver of claim 1 wherein said plurality of sampled absolute phase signals comprise signals having a duty cycle related to said absolute phase;

said sample average means comprises a digital integrator accummulating each of said plurality of sampled absolute phase signals;

wherein said sample average means converts each said duty cycle to a respective pulse signal having a related number of cycles; and said sample average means receiving said respective pulse signals providing a cumulative total over a baud interval corresponding to said baud rate.

6. The synchronous receiver of claim 5 wherein said carrier is differentially phase modulated by said binary data, said receiver further including clock recovery means providing a recovered clock signal according to said baud rate and a differential phase detector means comprising:

a reference phase memory storing a signal corresponding to said first absolute phase output signal according to said recovered clock signal;

a differential phase comparator comparing the next subsequent absolute phase output signal to said signal corresponding to said first absolute phase output signal providing a differential phase output corresponding to said data signal, wherein said reference phase memory stores said next subsequent absolute phase output signal after said differential phase output is produced.

7. The synchronous receiver of claim 6 wherein said reference phase memory comprises a presettable counter having a plurality providing a number of states corresponding to the number of data states possible within each baud interval;

said absolute phase comparison means comprise a plurality of multiple sample means each receiving an output of said reference phase memory counter and said received phase shift modulated signal providing a respective absolute phase output signal;

a resettable counter having a plurality of outputs providing a number of data states possible within each baud interval; said counter being incremented by a clock signal;

a logical comparator indicating the logical equivalence of said absolute phase comparator output and said resettable counter output, said differential phase output corresponding to the number of pulses required by said resettable counter to form said logical equivalence; and means to reset said resettable counter after said logical equivalence.

8. The synchronous receiver of claim 7, further comprising:

data quality measurement means connected to said sample average means providing a valid data signal.

9. The synchronous receiver of claim 8 wherein:

said data quality measurement means includes a data error counter, said valid data signal being produced at said data error counter output upon a predetermined number of consecutive low quality data signals produced by said sample average means.

10. The synchronous receiver of claim 1 wherein said carrier recovery means comprises a carrier phase-locked loop, wherein said recovered signal is phase-locked to the received phase shift modulated signal.

11. The synchronous receiver of claim 10 wherein said carrier phase locked loop comprises a digital second order phase locked loop.

12. The synchronous receiver of claim 11 wherein said carrier phase locked loop comprises a variable bandwidth phase locked loop.

13. The synchronous receiver of claim 1 further comprising:

first phase shift means receiving said received signal producing a quadrature pair recieved signal;

second phase shift means producing a quadrature pair recovered carrier signal; and wherein said absolute phase comparison means produces a plurality of measured phase differences, said synchronous receiver further comprising:

second multiple sample means;

said sample average means also receiving said multiple sample means output.

14. The synchronous receiver of claim 5 wherein:

said digital integrator comprise at least one digital counter, said digital counter being incremented by a clock signal when enabled by said baud rate control signal and a coincidence of at least one of a quadrature pair received signal and at least one of a quadrature pair recovered carrier signal, said digital counter having an output which, at the end of the time interval of the baud rate control signal corresponds to an average of the measured phase difference during the baud rate time interval.

15. The synchronous receiver of claim 14 wherein:

said absolute phase comparison means includes the number of integrating digital counters which in combination correspond to the number of unique integral phase shift data values of the received phase shift modulated signal, said absolute phase comparison means further includes:

an integer phase shift means to shift the recovered carrier frequency by integer values of phase;

an integer comparator means producing a phase time signal when the recovered carrier frequency is shifted by the number of integer phase shifts;

means to determine the number of integer phase shifts provided by integer phase shift means to produce a phase true signal producing a number output, wherein said number output corresponding to the data value of phase shifts of the received phase shift modulated signal.

16. The synchronous receiver of claim 15 wherein:

said received signal has four integer phase shift data values, each being 90°; and said received signal and said regenerated carrier have a phase shift difference of 45°.

17. The synchronous receiver of claim 15 further comprising:

carrier quality determination means including a coincidence means connected to said integrating digital counters providing a counter coincidence output corresponding to the mutual coincidence of the states of the integrating digital counters; and a hysterisis means producing a quality output enable signal receiving said coincidence output to provide a predetermined number changes of said coincidence output before said quality output, enable signal changes.

18. The syncronous receiver of claim 1, further comprising a self-adjusting wave forming means receiving a sinusoidal signal and providing said received signal comprising:

amplifier means having an inverting and non-inverting input and an output providing said digital received signal;

reference voltage means corresponding to a voltage at the mid-point of the amplifier output;

a first resistor connected to said amplifier output and said non-inverting input;

a second resistor connected to said non-inverting input and said reference voltage means;

a third resistor connected to said amplifier output and said inverting input; and a capacitor connected to said inverting input and said sinusoidal signal wherein the product of the values of the third resistor and the capacitor are substantially greater than the period of the sinusoidal signal.

19. A self-adjusting wave forming means receiving an analog signal having a periodicity and forming a digital received signal having the same periodicity as said analog signal, said wave forming means comprising:

amplifier means having an inverting and non-inverting input and an output providing said digital received signal;

reference voltage means corresponding to a voltage at the mid-point of the amplifier output;

a first resistor connected to said amplifier output and said non-inverting input;

a second resistor connected to said non-inverting input and said reference voltage means;

a third resistor connected to said amplifier output and said inverting input; and a capacitor connected to said inverting input and said analog signal wherein the product of the values of the third resistor and the capacitor are substantially greater than the period of the analog signal.

20. A method of detecting data signals in a digitally modulated carrier, comprising the steps of:

multiple data sampling the signal over a sample period corresponding to the open area of the eye pattern to sychronously detect said data signals;

averagaing the data sample over the sample period;

recovering a carrier signal; and phase-locking said recovered carrier signal over a period corresponding to the open area of the eye pattern.

21. The method of claim 20, further including the steps of generating a recovered clock signal, and phase locking said recovered clock signal over a period corresponding to the open area of the eye pattern.

* * * * *